United States Patent
Oda et al.

[11] Patent Number: 5,808,987
[45] Date of Patent: Sep. 15, 1998

[54] INFORMATION REPRODUCING SYSTEM FOR REPRODUCING INTERLEAVED IMAGE DATA AND VOICE DATA FROM A RECORDING MEDIUM IN ACCORDANCE WITH A CONTROL PROGRAM REPRODUCING FROM THE RECORDING MEDIUM

[75] Inventors: Toshiyuki Oda, Chigasaki; Tamotsu Ito, Ayase; Takashi Takeuchi, Fujisawa, all of Japan

[73] Assignee: Hitachi, Ltd., Tokyo, Japan

[21] Appl. No.: 678,441

[22] Filed: Apr. 1, 1991

[30] Foreign Application Priority Data

Mar. 30, 1990 [JP] Japan ................................ 2-080710

[51] Int. Cl.⁶ .................................................. G11B 7/00
[52] U.S. Cl. .............................. 369/47; 369/48; 369/124; 386/96
[58] Field of Search .................................. 369/42, 48, 49, 369/54, 32, 124, 58; 386/96; 395/154, 100, 152

[56] References Cited

U.S. PATENT DOCUMENTS

| | | | |
|---|---|---|---|
| 4,703,369 | 10/1987 | Moriyama et al. | 360/19.1 |
| 4,791,496 | 12/1988 | Kagagama et al. | 358/342 |
| 4,839,746 | 6/1989 | Kanamaru | 358/342 |
| 4,845,571 | 7/1989 | Hirano et al. | 360/72.2 |
| 4,953,153 | 8/1990 | Suzuki | 369/49 |
| 5,046,042 | 9/1991 | Nitatori et al. | 360/48 |
| 5,111,409 | 5/1992 | Gasper et al. | 395/154 X |

FOREIGN PATENT DOCUMENTS

| | | |
|---|---|---|
| 226487 | 10/1987 | Japan . |
| 161522 | 12/1987 | Japan . |

OTHER PUBLICATIONS

An Introduction to CD–ROM XA Philips/Microsoft/Sony, Sep. 1989.

*Primary Examiner*—Thang V. Tran
*Attorney, Agent, or Firm*—Antonelli, Terry, Stout & Kraus, LLP

[57] ABSTRACT

An interleaved data recording area for recording interleaved file data and a control program record area for recording a program to control the reproduction of the data are provided in an information recording medium, and the interleaved data record area is arranged succeeding the control program record area. Information of a transfer/output destination of the reproduced file data is included in the control program so that a plurality of interleaved and stored file data are continuously reproduced without retrieving control data.

10 Claims, 10 Drawing Sheets

FIG. 5A

| SECTOR NO. | RECORD STATUS ON CD-ROM |
|---|---|
| 0 | PROGRAM 1 |
| 1 | PROGRAM 1 |
| 2 | SOUND 1 |
| 3 | |
| 4 | PICTURE 1 |
| 5 | |
| 6 | SOUND 2 |
| 7 | |
| 8 | PICTURE 1 |
| 9 | |
| 10 | SOUND 1 |
| 11 | |
| 12 | PICTURE 1 |
| 13 | |
| 14 | SOUND 2 |
| 15 | |
| 16 | PICTURE 1 |
| 17 | |

INTERLEAVED DATA RECORD AREA (16 SECTORS)

FIG. 5B

TRANSFER TABLE OF PROGRAM 1

| SOURCE | DESTINATION | DATA LENGTH | |
|---|---|---|---|
| CD (SECTOR 2) | VOICE OUTPUT MEMORY | 1 | RECORD 1 |
| CD (SECTOR 3) | VRAM 1 (1/4) | 3 | RECORD 2 |
| CD (SECTOR 6) | SYSTEM MEMORY (1/2) | 1 | RECORD 3 |
| CD (SECTOR 7) | VRAM 1 (2/4) | 3 | RECORD 4 |
| CD (SECTOR 10) | VOICE OUTPUT MEMORY | 1 | RECORD 5 |
| CD (SECTOR 11) | VRAM 1 (3/4) | 3 | RECORD 6 |
| CD (SECTOR 14) | SYSTEM MEMORY (2/2) | 1 | RECORD 7 |
| CD (SECTOR 15) | VRAM 1 (4/4) | 3 | RECORD 8 |
| SYSTEM MEMORY (1/2) | VOICE OUTPUT MEMORY | 2 | RECORD 9 |

FIG. 6

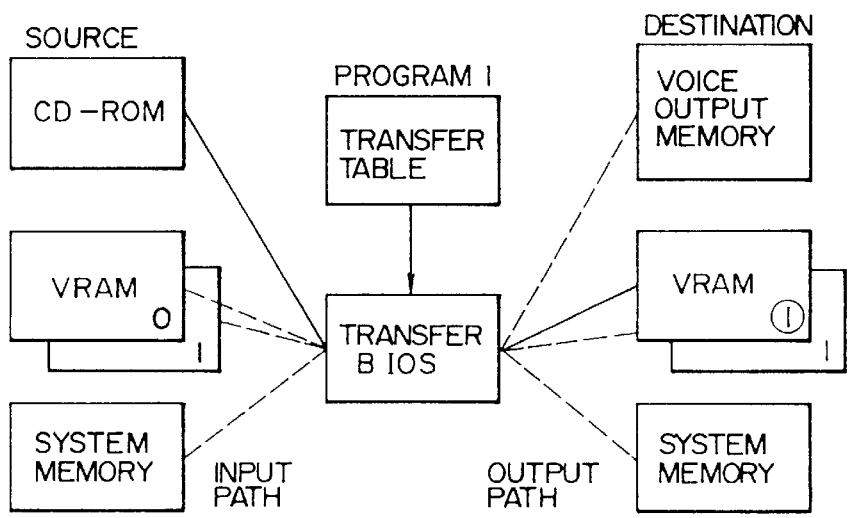

PROCESS TABLE

| NUMBER OF SECTORS | CONTENT OF PROCESS |
|---|---|
| 9 | FINE MOSAIC DISPLAY OF VRAM 0 |
| 12 | COARSE MOSAIC DISPLAY OF VRAM 0 |
| 16 | COARSE MOSAIC DISPLAY OF VRAM 1 |
| 18 | FINE MOSAIC DISPLAY OF VRAM 1 |
| 21 | NORMAL DISPLAY OF VRAM 1 |

INFORMATION REPRODUCING SYSTEM FOR REPRODUCING INTERLEAVED IMAGE DATA AND VOICE DATA FROM A RECORDING MEDIUM IN ACCORDANCE WITH A CONTROL PROGRAM REPRODUCING FROM THE RECORDING MEDIUM

BACKGROUND OF THE INVENTION

The present invention relates to a system for reproducing information stored in a large capacity information recording medium and transferring it to different devices in an efficient way, and more particularly to an information recording and reproducing system for processing information such as displaying an image while continuously outputting voice information.

Recently, an information recording and reproducing system which uses an optical disk as a recording medium has been put in practice. The optical disk is used as an auxiliary storage for an image file system or a computer system which handles a large volume of data.

The optical disk can store image data as well as various types of information such as voice data and text data. However, since a track accessing speed of the optical disk is lower than that of a magnetic disk, it is necessary to efficiently control the large volume of data.

A conventional optical disk file control system is disclosed in JP-A-62-226487. A prior art large volume database control system is disclosed in JP-A-1-161522.

The former intends to centrally control the large volume data and control information for the data on an optical disk. The latter, although it relates to a magnetic disk drive, intends to reduce the number of times of accessing the data by locally recording the data and the control information.

In the conventional systems, the control information is read from the disk, a file is searched and desired data is retrieved from the file. In the conventional systems, the data may be continuously read by storing the data in a continuous area of the recording medium.

However, in a multimedia system in which an image is displayed while voice is always outputted, the conventional system in which the image data and the voice data are stored in separate areas needs a large capacity buffer memory to temporarily store one of the voice data and the image data in a system memory.

Where the image data read from the disk is to be modified before it is displayed on a screen, the conventional system needs a time to read the image data plus a modification time. Accordingly, an efficiency is low when it is applied to a system which reproduces and output a number of types of data.

SUMMARY OF THE INVENTION

In order to resolve the above problem, in accordance with the present invention, an interleaved record area for recording interleaved file data and a control program record area for recording a program which controls the reading of the data are provided on an information recording medium, and the interleaved data record area is arranged following the control program record area.

In the present specification, the term recording on a CD-ROM or a recording medium does not means the recording by a reproducing apparatus but means the prerecording of desired information on the recording medium.

The control program is loaded from the information recording medium to the system memory of the computer to transfer the interleave-recorded file data to an output device or a memory. Since the interleave-recorded file data is stored in the output device or the memory, it is not necessary to access the information recording medium and the access speed is improved.

In order to allow the interleave-recorded file data to be transferred continuously without retrieving the control information, the transfer destination information of the reproduced information is included in the control program.

In order to stabilize the operation of the control program, a minimum unit for the interleaved recording of the file data is a sector, a transfer information record is prepared for each continuing sector of the file data, and all transfer information records of the interleaved data record area are collectively included in the control program as a transfer table.

Where a plurality of pairs of the control program record area and the interleaved data record area are provided, reproduction/transfer areas of the file data may overlap when the transfer table is looked up. Accordingly, the transfer operations in accordance with the transfer table are included in the computer system as a transfer basic I/O system (BIOS).

Further, in order to allow an application program to monitor a process of reproduction/transfer from the information recording medium to synchronize the timing of processing such as data modification or switching of a display screen, the transfer BIOS is driven by timer interruption and the number of transferred sectors is stored in the system memory of the computer system.

When the transfer BIOS is provided in the computer system, the transfer BIOS is recorded on the same information recording medium as that on which the interleaved data and the control program are recorded and it is loaded to the system memory, instead of recording it as an exclusive record of the computer system so that the transfer BIOS has a processing scheme suitable to the interleave-recorded file data.

When a number of types of data are to be reproduced and outputted in parallel, the interval of the timer interruption is set to be shorter than a time required for the information recording and reproducing system to reproduce one sector from the information recording medium in order to facilitate synchronization.

Whenever a sector of data cannot be transferred when the transfer BIOS is driven by the timer interruption, the interruption is terminated without waiting for the transfer ready state so that the data transfer is executed in real time.

In order to allow a large volume of reproduction of the information recording medium having the transfer BIOS, the control program and the interleaved data recorded therein, a read-only optical disk (CD-ROM (compact disk read-only memory)) is used as the information recording medium.

The CD-ROM is a read-only memory having pits formed therein, and it is characterized by the ability of reproducing a large number of copies from an original disk. By preparing CD-ROMs from the original disk prepared by the information recording system of the present invention, the information recording media having various types of large volume files such as image data, voice data and text data recorded therein may be easily reproduced.

It is an object of the present invention to provide an information recording and reproducing system which uses a large capacity recording medium such as an optical disk in which various types of data can be processed without using a large capacity buffer memory.

It is another object of the present invention to provide a system which reproduces and outputs various types of data from a disk in a short time.

BRIEF DESCRIPTION OF THE DRAWINGS

FIGS. 5A and 5B show a record status of the optical disk in accordance with the present invention and a corresponding transfer table, FIG. 6 shows a block diagram of a transfer which uses a transfer BIOS.

DESCRIPTION OF THE PREFERRED EMBODIMENTS

An embodiment of the present invention applied to a system which uses a CD-ROM is now explained with reference to the drawings.

Figure 2:
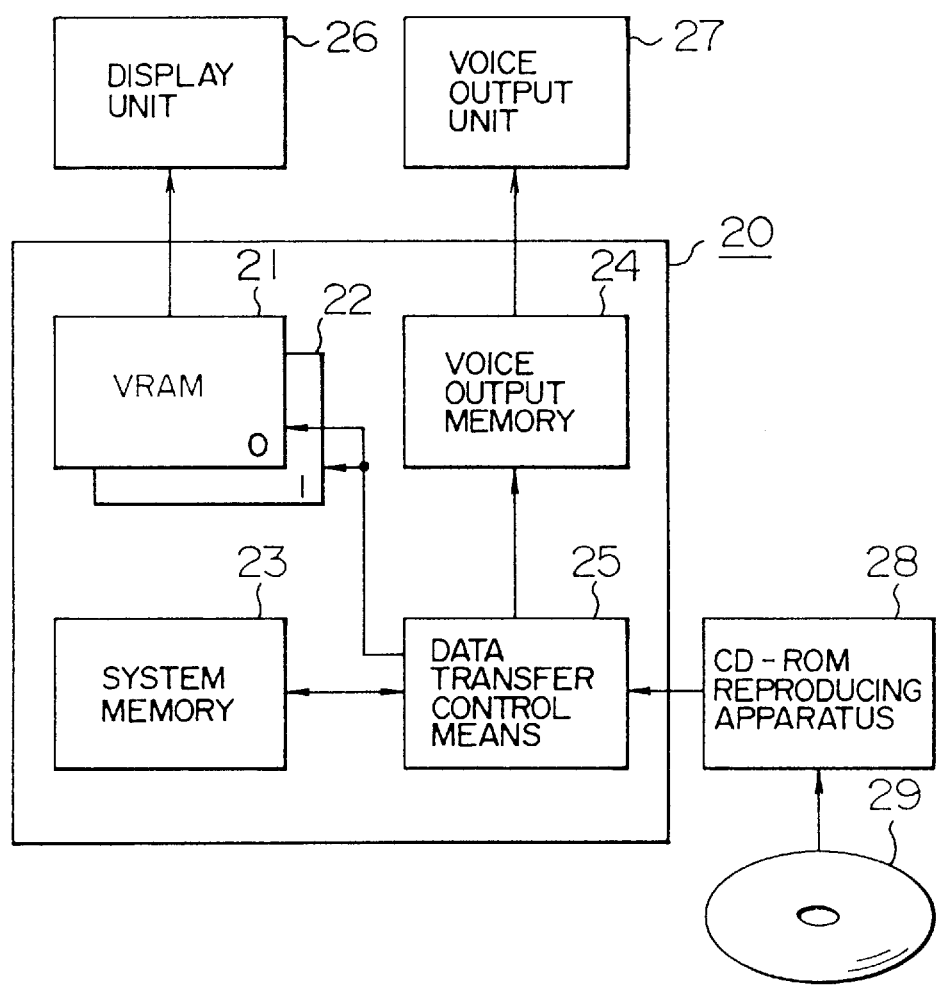
FIG. 2 shows a block diagram of a system to which the present invention is applied.

FIG. 2 shows a block diagram of a computer system to which the present invention is applied.

A computer system 20 comprises video random access memories (VRAM) $VRAM_0$ 21 and $VRAM_1$ 22 for storing two frames of image information, a system memory 23, a voice output memory 24 for storing voice output data and data transfer control means 25 for transferring data between blocks. A display unit 26, a voice output unit 27 and a CD-ROM reproducing apparatus 28 are connected to the computer system 20.

The display unit 26 reads the image data from one of $VRAM_0$ 21 and $VRAM_1$ 22 selected by the computer system 20 and displays it. The voice output unit 27 reads the voice data stored in the voice output memory 24 and outputs it. The CD-ROM reproduction apparatus 28 reproduces the data recorded on the CD-ROM and transfers the data to the computer system 20 in accordance with a request from the data transfer control means.

Figure 1:
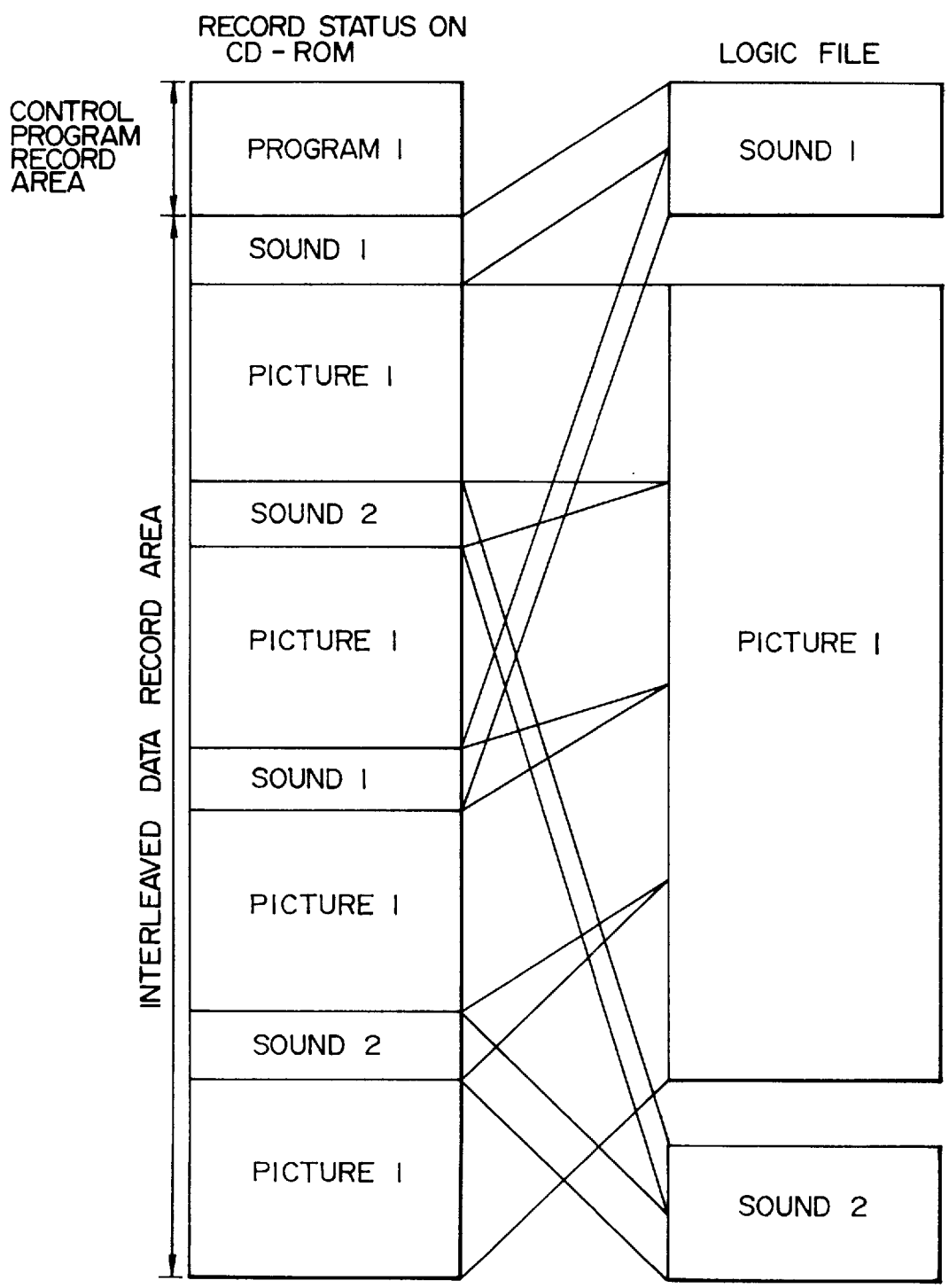
FIG. 1 illustrates a record status of an optical disk in accordance with the present invention.

FIG. 1 shows a record status of the CD-ROM (information recording medium) 29 and interleave-recorded files in the present embodiment in a logical continuous diagram.

As shown in FIG. 1, a control program (program 1), an image data file (picture 1) and two voice data files (sound 1 and sound 2) are recorded on the CD-ROM 29. The image data includes a color palette of color attribution information to be referred to in displaying the image.

The control program (program 1) reproduces the interleaved data and transfers the data to a desired one of $VRAM_0$ 21, $VRAM_1$ 22, voice output memory 24 and the system memory 23.

In FIG. 1, since the interleaved data is recorded continuously with the control program, the interleaved data may be reproduced immediately after the control program has been loaded to the computer system 20, without track accessing. Further, since the image data is interleaved between the voice data, the image data may be reproduced and transferred immediately without track accessing while the voice data stored in the voice output memory 24 is read and outputted by the voice output unit 27.

Figure 3A:
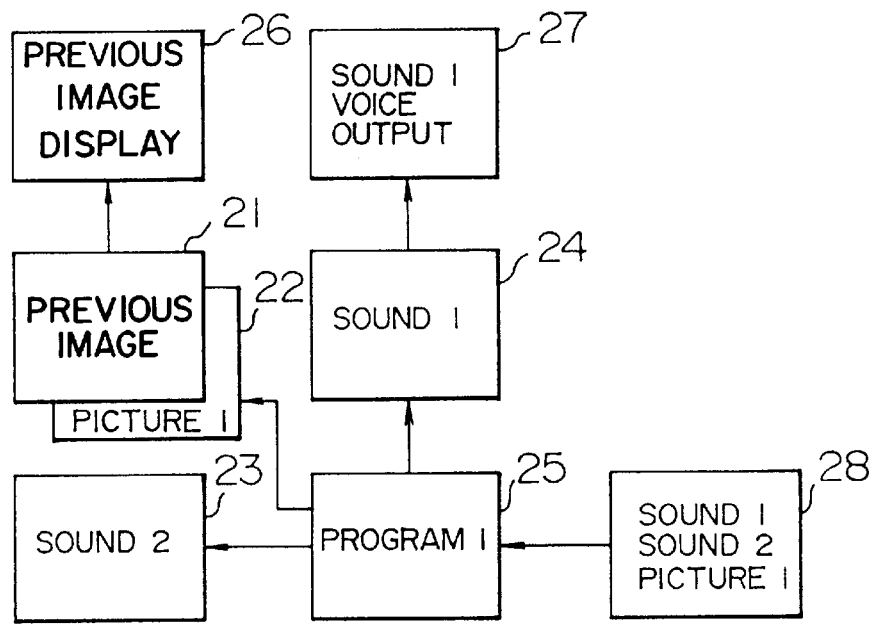
FIGS. 3A and 3B illustrate a data transfer method in outputting voice data and image data.
Figure 3B:
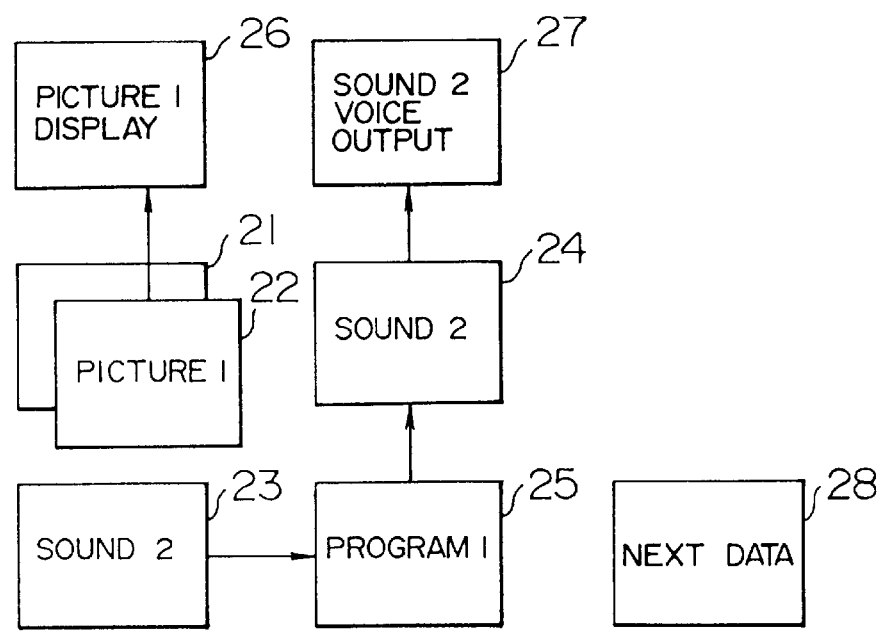

FIGS. 3A and 3B show a data flow in outputting the image and the voice by using the CD-ROM shown in FIG. 1.

The object of the data reproduction and transfer in FIGS. 3A and 3B is to reproduce and display the image data while the voice data is continuously outputted.

FIG. 3A shows a block diagram of a data transfer path when picture 1 is reproduced while sound 1 is outputted.

The control program (program 1) loaded from the CD-ROM reproducing apparatus 28 to the computer system 20 acquires the reproduced data from the CD-ROM reproducing apparatus 28 by using the data transfer control means 25. When the reproduced data is picture 1, it is transferred to $VRAM_1$ 22, when it is sound 1, it is transferred to the voice output memory 24, and when it is sound 2, it is transferred to the system memory 23.

During this period, the display unit 26 displays previous image data stored in $VRAM_0$ 21, and picture 1 being loaded into $VRAM_1$ 22 is not displayed. The voice output unit 27 outputs sound 1 stored in the voice output memory 24.

FIG. 3B shows a block diagram of a data transfer path when sound 2 is outputted while picture 1 is displayed.

In FIG. 3B, in order to display the stored picture 1, program 1 issues a display switching command to the display unit 26 to display $VRAM_1$ 22. Then, it transfers the voice data (sound 2) stored in the system memory 23 to the voice output memory 24. As a result, the voice output device 27 outputs sound 2 stored in the voice output memory 24.

While the voice data is outputted, the control program 1 can reproduce the next data from the CD-ROM reproducing apparatus 28 by using the data transfer control means 25.

Figure 4:
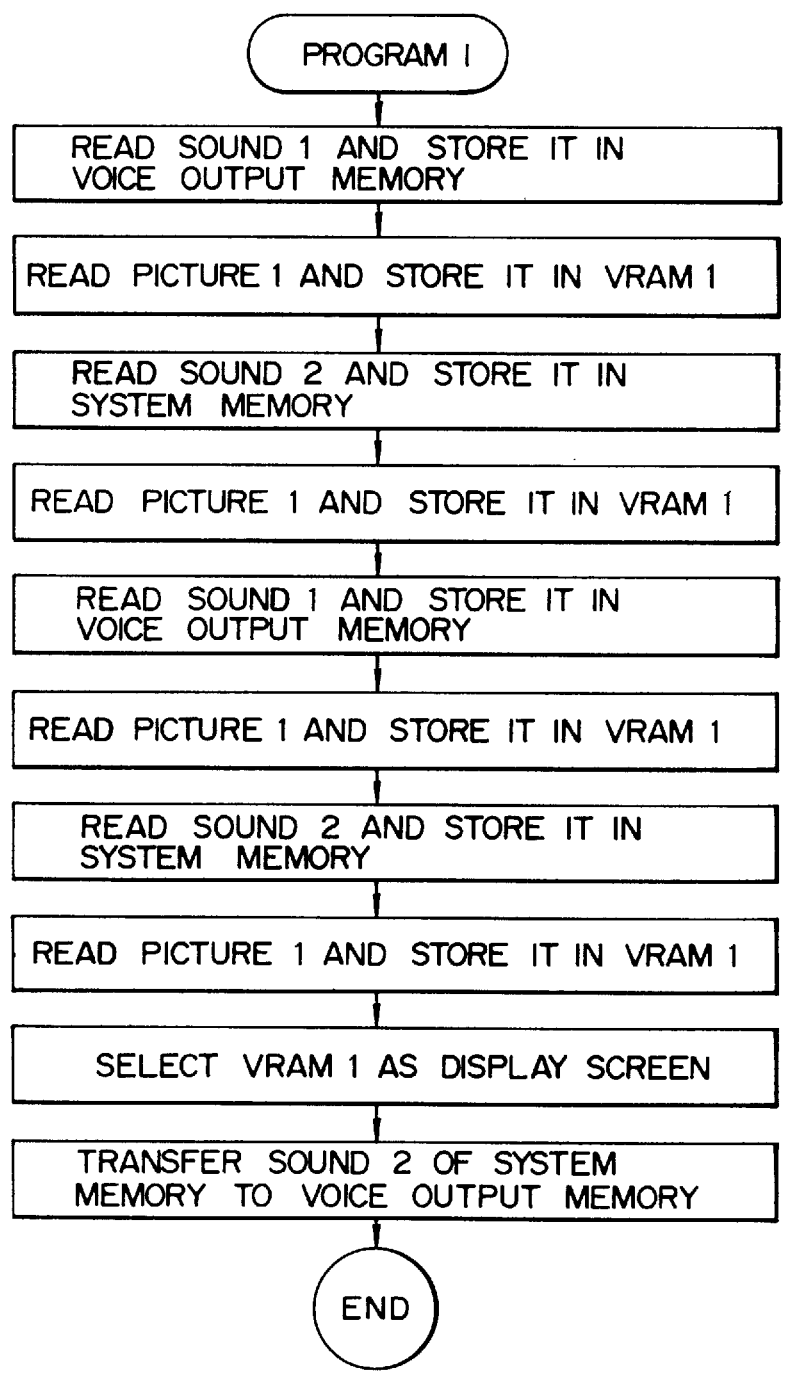
FIG. 4 shows a flow chart of a control program.

FIG. 4 shows a flow chart of a control sequence of the control program (program 1) which outputs the image/voice by using the data transfer means 25.

Program 1 reads sound 1 from the CD-ROM and stores the voice data into the voice output memory. Thus, the computer system 20 outputs the voice for a time period corresponding to the data amount stored.

Then, it reads out picture 1 from the CD-ROM 29 and stores it into the $VRAM_1$. Since the display at this time is for the data of $VRAM_0$, picture 1 stored in $VRAM_1$ is not displayed.

Then, sound 2 is read from the CD-ROM 29 and it is stored into the system memory.

Then, the succeeding data of picture 1 is read from the CD-ROM 29 and stored into the succeeding area of $VRAM_1$.

Then, the succeeding data of sound 1 is read from the CD-ROM 29 and stored into the voice output memory. The succeeding data of sound 1 is stored before the time period corresponding to the data amount of sound 1 previously stored so that the voice is continuously outputted.

Then, the succeeding data of picture 1 is read from the CD-ROM 29 and it is stored into the succeeding area of $VRAM_1$.

Then, the succeeding data of sound 2 is read from the CD-ROM 29 and it is stored into the succeeding area of the system memory.

Then, the succeeding data of the picture 1 is read from the CD-ROM 29 and it is stored into the succeeding area of VRAM$_1$. In this manner the entire data of picture 1 is stored in VRAM$_1$.

Then, the display screen is switched to VRAM$_1$. Thus, picture 1 is displaced in place of the previous screen.

Then, the data of sound 2 stored in the system memory is transferred to the voice output memory. Thus, the computer system outputs the voice for a time period corresponding to the data amount of sound 2 stored. After the data of sound 2 has been stored, the data transfer control means 25 is idle so that the next data can be read from the CD-ROM 29.

In the present invention, a plurality of voice/image files are interleave-recorded in the CD-ROM so that the image is reproduced while the voice is continuously outputted. Since the control program is arranged immediately preceding the interleave-recorded voice/image file, the voice/image file can be reproduced immediately after the loading of the control program.

FIGS. 5A and 5B show a record status of the CD-ROM and a content of table stored in the control program in another embodiment of the present invention.

As shown in FIG. 5A, a control program (program 1), voice files (sound 1 and sound 2) and an image file (picture 1) are recorded on the CD-ROM 29.

Data lengths of those files have a minimum unit corresponding to a sector of the CD-ROM 29, and program 1 is recorded in sectors 0 and 1, sound 1 is recorded in sectors 2 and 10, sound 2 is recorded in sectors 6 and 14 and picture 1 is recorded in sectors 3 to 5, 7 to 9, 11 to 13 and 15 to 17.

Program 1 includes a transfer table shown in FIG. 5B, and reproduces and transfers the interleave-recorded voice/image file in accordance with the transfer table.

The transfer table comprises a plurality of records each including a location of transfer source data a, designation of transfer destination memory and the number of sectors representing the data length to be transferred. For example, record 1 in FIG. 5B indicates that one sector of data is to be transferred from sector 2 of the CD-ROM 29 to the voice output memory 24. Record 2 indicates that three sectors of data is to be transferred from sector 3 of the CD-ROM 29 to a first quarter area of VRAM 1.

In this manner, program 1 reproduces and transfers the voice/image file in accordance with the transfer table shown in FIG. 5B so that the image is displayed while the voice is continuously outputted, as is done in the sequence shown in FIG. 4.

The portion of the control program which controls the reproduction/transfer of the file data operates in accordance with the transfer table. Therefore, it can be separated from the portion which modifies the reproduced data and controls the display unit. As a result, the operation of the control program is stable and the program size can be reduced.

FIG. 6 shows a block diagram of a transfer status of the file data in another embodiment of the present invention.

In FIG. 6, a transfer source of the file data and a destination of the file data are interconnected by a transfer BIOS (basic I/O system). The transfer BIOS refers to the transfer table of program 1, selects an appropriate input path and an appropriate output path in accordance with the content of a record in the transfer table, and reproduces and transfers the file data.

The transfer BIOS is arranged in the system memory of the computer system and the control program delivers the transfer table to shift the control of reproduction/transfer to the transfer BIOS so that an interpretation/execution process of the transfer table is separated from the control program. As a result, the reproduction/transfer process, which depends on the peripheral equipment such as the display unit and the CD-ROM reproducing apparatus which are connected to the computer system, is assigned to the transfer BIOS so that the dependency of the control program on the machine type is eliminated and the program size is reduced.

Figure 7:
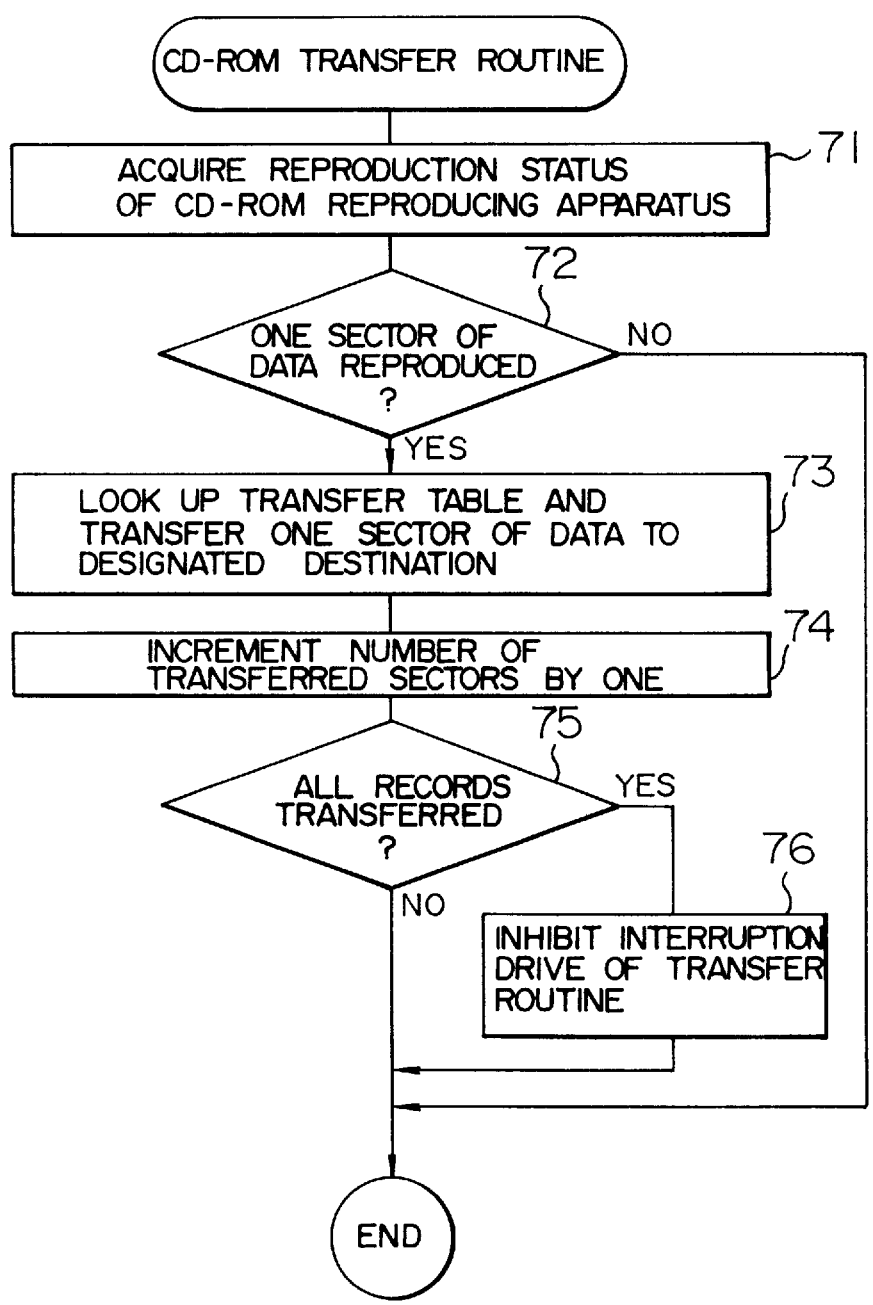
FIG. 7 shows a flow chart of a CD-ROM transfer routine.

FIG. 7 shows another embodiment of the present invention and shows a flow chart of a sequence in which the transfer BIOS transfers the file data from the CD-ROM.

In FIG. 7, the CD-ROM transfer routine is driven by interruption. The interruption occurs periodically. The interruption is permitted when the control program delivers the transfer table to the transfer BIOS and control is shifted to the transfer BIOS.

Steps of the CD-ROM transfer routine are explained below.

The CD-ROM transfer routine driven by the interruption checks a reproduction status such as how much of the data read from the CD-ROM the reproducing apparatus has (step 71).

If the result of the check indicates that the reproduced data is less than one sector, the transfer process is immediately terminated and the control is returned to the host application system (step 72).

If the reproduced data is more than one sector, one sector of data is acquired from the CD-ROM reproducing apparatus and the data is transferred to a desired destination in accordance with the instruction of the transfer table (step 73). The number of transferred sectors plus one is stored in a work area which stores the sector number of the end of transfer (step 74).

In FIG. 7, the number of transferred sectors is an accumulated number of transferred sectors counted from the first reproduction sector number in the interleaved data record area. In the example shown in FIG. 5A, the interleaved data record area starts at the sector 2 and the number of transferred sectors required to fully store the image file (picture 1) in VRAM$_1$ is sixteen.

Whether the transfer from the CD-ROM has been completed or not is checked for all records of the transfer table. If the transfer of all records has not been completed, the transfer process is terminated and the control is returned to the host program (step 75).

If the transfer of all records has been completed, there is no data to be acquired from the CD-ROM reproducing apparatus, and the interruption of the CD-ROM transfer routine is inhibited and the control is returned to the host program (step 76).

In general, a speed to transfer the data reproduced from the magnetic disk or the optical disk by the reproducing apparatus to the computer system is faster than a speed to reproduce the data, and the same is true for the reproduction and the transfer in the CD-ROM. By driving the CD-ROM transfer routine by timer interruption, the file data can be transferred at high speed when the CD-ROM reproducing apparatus is ready to transfer one sector of data and the computer system can carry out other jobs if the reproducing apparatus is not ready. In this manner, the reproduction and the transfer of the CD-ROM and other processes are carried out in real time and the operation efficiency of the computer system is improved. Further, since the number of sectors to complete the transfer is recognized by the host program, the display may be switched in accordance with the transfer status.

Figures 8, 9:
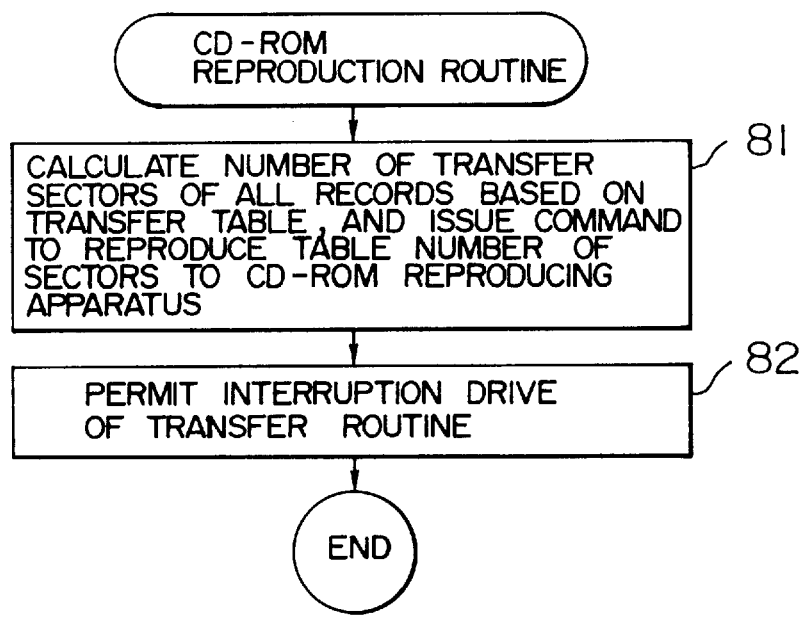
FIG. 8 shows a flow chart of a CD-ROM reproduction routine.
FIG. 9 shows a processing table.

FIG. 8 shows a flow chart of the CD-ROM reproduction routine to read out data from the CD-ROM.

The CD-ROM reproduction routine is executed when the control program delivers the transfer table to the transfer BIOS and the control is shifted to the transfer BIOS.

In the CD-ROM reproduction routine, all records of the transfer table delivered from the control program are checked to count the number of transfer sectors of the file data to be continuously reproduced from the CD-ROM. An instruction to reproduce the counted sectors is issued to the CD-ROM reproducing apparatus (step 81).

Then, the interruption of the CD-ROM transfer routine is permitted (step 82).

Thus, the CD-ROM reproducing apparatus reads the data of the CD-ROM and the CD-ROM transfer routine transfers the data by the timer interruption.

FIG. 9 shows a process table to switch the display in synchronism with the reading of the data from the CD-ROM.

The data on the CD-ROM shown in FIG. 5A is reproduced and transferred by the process shown in FIGS. 6 to 8 so that the process is in synchronism with the number of transferred sectors. The process table of FIG. 9 comprises the number of transferred sectors and the content of process.

A mosaic display of the content of process in the process table is an image display produced by diffusing one pixel of data into data of surrounding pixels. It has an effect of dimly displaying a pattern of the original image. Actually, a controller of the display unit has such a function that the pixel data is diffusion-displayed in the display step and the image data per se stored in VRAM is not modified so that the mosaic display is attained by issuing a mosaic display command to the controller from the application program.

Since the image data stored in the VRAM is retained even during the processing for the mosaic display, the normal display is continuously attained without transferring new image data.

In accordance with the process table shown in FIG. 9, if the number of transferred sectors is larger than fifteen, the content of $VRAM_1$ is displayed, and if the number is less than fifteen, the content of $VRAM_0$ is displayed with the mosaic effect.

Figure 10:
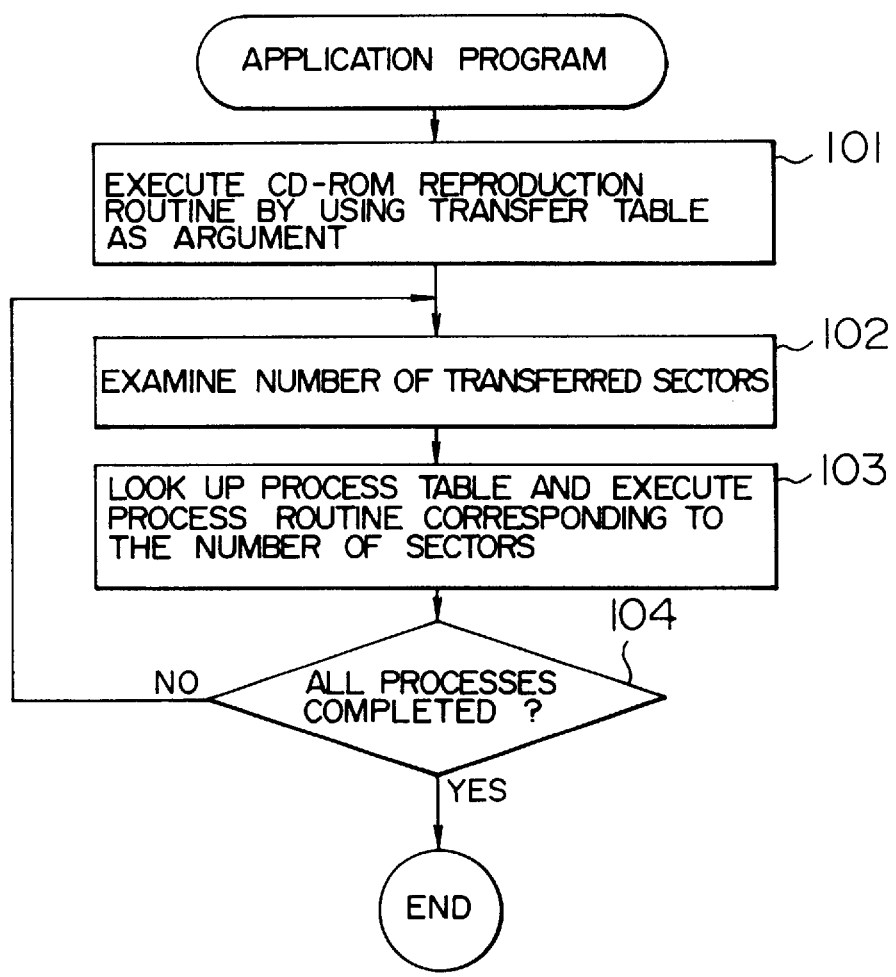
FIG. 10 shows a flow chart of an application program.

FIG. 10 shows a flow chart of an application program which reads the data from the CD-ROM and outputs it.

The data on the CD-ROM shown in FIG. 5A is reproduced and outputted by the process shown in FIGS. 6 through 9 so that the voice and the image are outputted in synchronism. The process of reproduction, transfer and output is explained with reference to FIG. 10.

A transfer table prepared in accordance with the record status of the CD-ROM is used as an argument to execute the CD-ROM reproduction routine (step 101). Thus, the timer interruption of the transfer routine is permitted and the data of the CD-ROM is serially transferred in accordance with the transfer table.

While the data transfer is not being executed by the timer interruption, the application program examines a predetermined work area to acquire the number of sectors for which the transfer routine has completed the transfer (step 102).

It then to refers the process table and if there is a record corresponding to the acquired number of transferred sectors, the corresponding process routine is executed (step 103).

After all processes registered in the process table have been executed, the application program is terminated. If there is an unprocessed record, the process returns to the step 102 to repeat the execution of the process table (step 104).

By transferring the data by the timer interruption, the voice output and the image data storage are effected in the background when viewed from the host application program. As a result, the application program can easily synchronize the outputting of the voice and image and various processings.

In the present embodiment, the application program conducts the display process. By registering the content of process in accordance with the number of transferred sectors in the process table as one record, data may be transferred in real time when scientific calculation is effected in the foreground or data is modified.

When a process is to be executed in synchronism with the number of transferred voice or image data within a synchronization error of one sector between the transfer and the process, it is necessary that the interval of timer interruption of the transfer routine is shorter than the time required for the CD-ROM reproducing apparatus to reproduce one sector of information from the CD-ROM.

Figure 11:
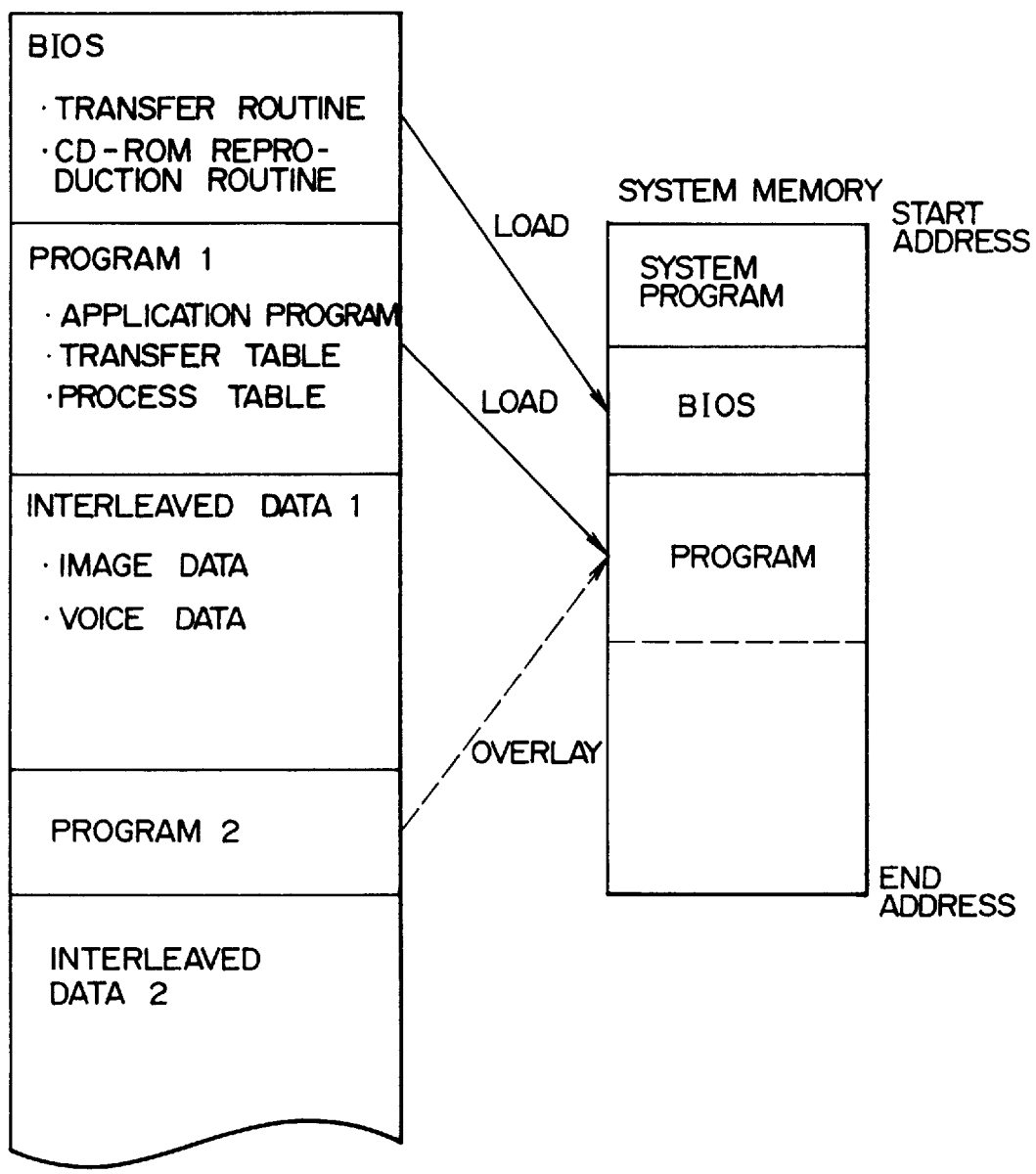
FIG. 11 shows a record status of the optical disk in accordance with the present invention and a method of loading data in a system memory.

FIG. 11 shows a record status of the CD-ROM and a record status of the system memory in another embodiment of the present invention.

In FIG. 11, the BIOS is recorded at the leading area of the CD-ROM, and a plurality of combinations of control program (program 1) and interleaved data are recorded to follow the BIOS.

The BIOS comprises a CD-ROM reproduction routine for issuing a reproduction command to the CD-ROM reproducing apparatus and permitting interruption of the transfer routine, and a transfer routine driven by the timer interruption. The BIOS is a basic I/O system which reproduces and transfers the data of the CD-ROM in accordance with the transfer table delivered from the host application program. It is loaded to an appropriate area of the system memory when the computer system is started up or prior to the start of execution of the application program.

The control program (program 1) controls the reproduction and output of the interleaved data (interleaved data 1), and the program 2 controls the reproduction and output of the interleaved data 2.

The program 1 has an application program, a transfer table and a process table, and it is loaded a vacant area of the system memory.

When the interleaved data 1 has been reproduced and outputted in accordance with the transfer table and the process table of the program 1, the program 1 is no longer necessary and it is removed from the system memory and the next control program 2 is overlayed and the interleaved data 2 is continuously reproduced and outputted.

Thus, by recording the BIOS, the control program and the interleaved data on the CD-ROM separately, the reproduction/output routine can be used in common. Further, since the BIOS, the control program and the data are recorded on the same medium, they can be readily centrally controlled and the restriction to the operation condition of the application program can be reduced.

Figure 12:
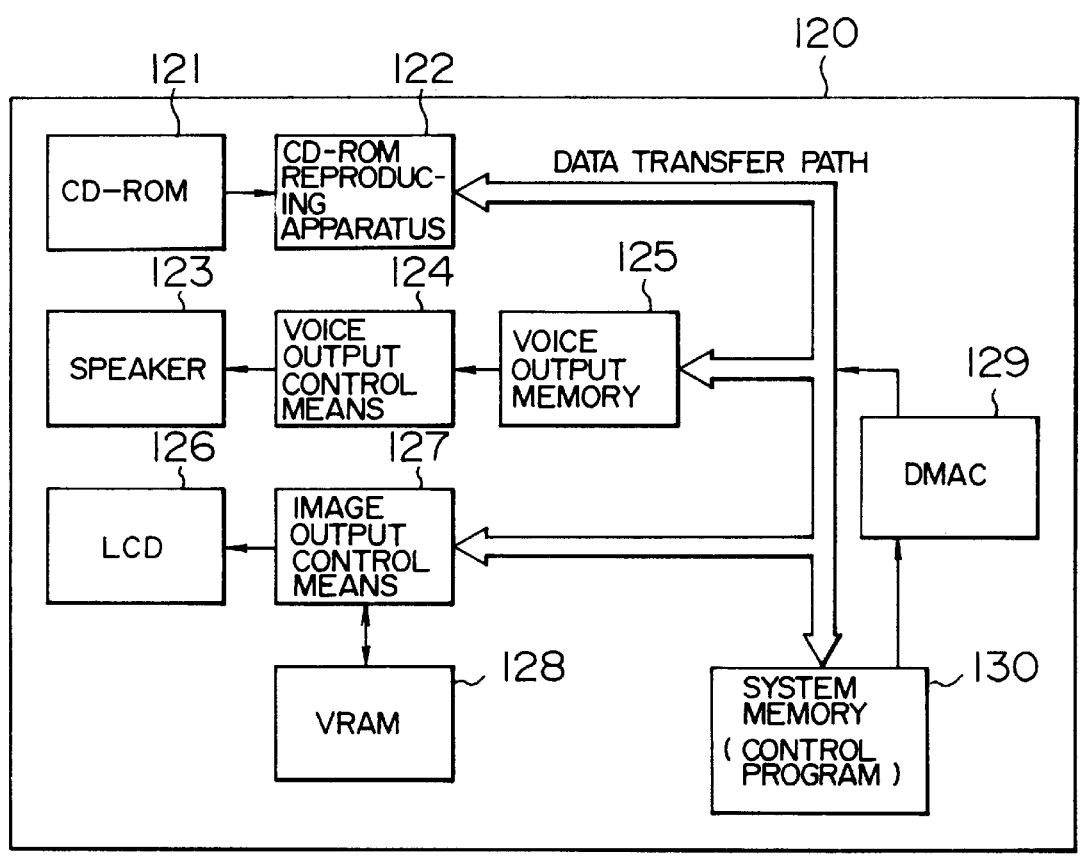
FIG. 12 shows a system block diagram of a CD-ROM reproducing system of the present invention.

FIG. 12 shows a system block diagram of the CD-ROM reproducing system of the present invention.

In FIG. 12, a CD-ROM reproducing system 120 has a CD-ROM 121 which has the voice data, the image data and the control program recorded therein, and the data on the CD-ROM 121 is reproduced by a CD-ROM reproducing apparatus 122.

The reproduced control program is stored into a system memory 130, and the reproduced data is transferred to a voice output memory 125 if the reproduced data is voice data, and to a VRAM 128 through image output control means 127 if the reproduced data is image data, in accordance with the control program.

The voice data is outputted to a speaker 123 by voice output control means 124, and the image data is outputted to a liquid crystal display 126 by image output control means 127.

Where the reproduced data is to be modified before it is outputted, the data is stored into the system memory 130 and modified therein, and then it is transferred to the voice output memory 125 or the VRAM 128.

The transfer path of the data (the arrows in the figure) is determined by the control program. Since the data transfer is processed in the background by the timer interruption, the data transfer is executed by a direct memory access controller (DMAC) 129.

In this manner, the data is transferred at a high speed in the background, and the data is modified and output units are controlled in the foreground. Accordingly, the modification and the outputting are effected while maintaining synchronism between the voice and image outputs.

In the present embodiment, a liquid crystal display is used although a cathode ray tube (CRT) or television monitor may be used in place of it.

While the CD-ROM is used as the information recording medium in the above embodiments, an optical disk or a magnetic recording medium may be used in a system having an information recording and reproducing apparatus which can record and reproduce a sector number.

In the embodiments of the present invention, the control program is arranged in the leading sector or following the record area of the BIOS, although it may be arranged in an area which is close to the interleave-recorded area.

The present invention offers the following advantages. Since the file data and the control program to reproduce and output it are arranged closely to each other on the information recording medium, the data can be reproduced and outputted immediately after the loading of the program, without track accessing. Since the destination of the reproduced data is stored in the table and the transfer BIOS executes the data transfer, the high speed data transfer is attained without intervention of an application program.

Further, since the transfer BIOS is driven by the timer interruption, the application program can process other tasks during the reproduction and transfer of the data so that the computer system can be operated efficiently. As a result, the load on the application program is reduced and the operation of the application program is stabilized and the quality is improved.

Since the member of sectors for which the transfer BIOS has completed the transfer can be identified by the host application program, the process which is synchronized with the reproduction and transfer of data is attained. As a result, the voice and the image are synchronized and an effective output is readily attained.

Since the CD-ROM is used as the information recording medium and means for checking whether the data longer than one sector has been stored or not is provided in the CD-ROM reproducing apparatus, the data is transferred in real time.

Further, by preparing an original disk having the transfer BIOS, the control program and the data prerecorded by pits, a number of CD-ROMs having a large volume of data recorded thereon can be reproduced.

What is claimed is:

1. An information reproducing system comprising:

a reproducing apparatus for reproducing information from a recording medium on which information including a control program, image data, and voice data is recorded, the control program, the image data, and the voice data being recorded at separate locations on the recording medium, the control program specifying how the image data and the voice data recorded on the recording medium are to be reproduced, stored, modified, and output, the control program including at least one control table;

a display unit for displaying image data;

a voice output unit for outputting voice data; and a computer system including:

a system memory;

an image memory connected to the display unit;

a voice output memory connected to the voice output unit;

means for controlling the reproducing apparatus to reproduce the control program recorded on the recording medium;

means for executing the reproduced control program;

means for controlling the reproducing apparatus to selectively reproduce the image data and the voice data recorded on the recording medium by individually reproducing the image data and the voice data from the separate locations at which the image data and the voice data are stored on the recording medium in accordance with the at least one control table in the executed control program;

means for selectively storing the reproduced image data and the reproduced voice data in one of the system memory, the image memory, and the voice output memory in accordance with the at least one control table in the executed control program;

means for modifying the reproduced image data and the reproduced voice data in accordance with the executed control program;

means for controlling the image memory in accordance with the at least one control table in the executed control program; and means for controlling the voice output memory in accordance with the executed control program.

2. An information reproducing system according to claim 1, wherein the image data is recorded on the recording medium as a plurality of image data blocks, and the voice data is recorded on the recording medium as a plurality of voice data blocks;

wherein the recording medium has a control program area in which the control program is recorded, and an interleaved data area in which the image data blocks and the voice data blocks are recorded in an interleaved manner; and wherein the interleaved data area immediately succeeds the control program area on the recording medium.

3. An information reproducing system according to claim 2, wherein the at least one control table in the control program includes a transfer table including transfer information specifying a data transfer path and a data transfer method for each of the image data blocks and each of the voice data blocks for use in reproducing and storing the image data and the voice data recorded on the recording medium.

4. An information reproducing system according to claim 3, wherein the recording medium has sectors in which the information is recorded; and wherein each of the image data blocks and each of the voice data blocks is recorded in an integral number of continuous sectors.

5. An information reproducing system according to claim 4, wherein the computer system further includes means for storing a transfer basic I/O system in the system memory, the transfer basic I/O system being for use in reproducing and storing the image data and the voice data recorded on the recording medium; and means for modifying the transfer basic I/O system stored in the system memory in accordance with the transfer information in the transfer table in the control program.

6. An information reproducing system according to claim 5, wherein the computer system further includes means for driving the transfer basic I/O system with a timer interruption; and wherein the transfer basic I/O system stores in the system memory a number of sectors of the image data and the voice data recorded on the recording medium that have been reproduced and stored.

7. An information reproducing system according to claim 6, wherein an interval of the timer interruption is shorter than a period of time required for the reproducing apparatus to reproduce one sector of information recorded on the recording medium.

8. An information reproducing system according to claim 5, wherein a transfer basic I/O system is recorded on the recording medium in an area other than the control program area and the interleaved data area; and wherein the means for storing a transfer basic I/O system in the system memory includes means for controlling the reproducing apparatus to reproduce the transfer basic I/O system from the recording medium prior to reproducing the image data and the voice data recorded on the recording medium, and for storing the reproduced transfer basic I/O system in the system memory.

9. An information reproducing system comprising:

a reproducing apparatus for reproducing information from a recording medium on which information including a control program, image data, and voice data is recorded, the control program, the image data, and the voice data being recorded at separate locations on the recording medium, the control program specifying how the image data and the voice data recorded on the recording medium are to be reproduced, stored, modified, and output;

a display unit for displaying image data;

a voice output unit for outputting voice data; and a computer system including:

a system memory;

an image memory connected to the display unit;

a voice output memory connected to the voice output unit;

means for controlling the reproducing apparatus to reproduce the control program recorded on the recording medium:

means for executing the reproduced control program;

means for controlling the reproducing apparatus to selectively reproduce the image data and the voice data recorded on the recording medium by individually reproducing the image data and the voice data from the separate locations at which the image data and the voice data are stored on the recording medium in accordance with the executed control program;

means for selectively storing the reproduced image data and the reproduced voice data in one of the system memory, the image memory, and the voice output memory in accordance with the executed control program;

means for modifying the reproduced image data and the reproduced voice data in accordance with the executed control program; and means for controlling the image memory and the voice output memory in accordance with the executed control program;

wherein the image data is recorded on the recording medium as a plurality of image data blocks, and the voice data is recorded on the recording medium as a plurality of voice data blocks;

wherein the recording medium has a control program area in which the control program is recorded, and an interleaved data area in which the image data blocks and the voice data blocks are recorded in an interleaved manner;

wherein the interleaved data area immediately succeeds the control program area on the recording medium;

wherein the control program includes transfer information specifying a data transfer path and a data transfer method for each of the image data blocks and each of the voice data blocks for use in reproducing and storing the image data and the voice data recorded on the recording medium;

wherein the recording medium has sectors in which the information is recorded;

wherein each of the image data blocks and each of the voice data blocks is recorded in an integral number of continuous sectors;

wherein the reproducing apparatus includes a buffer memory for temporarily storing information reproduced from the recording medium;

wherein the computer system further includes means for inquiring of the reproducing apparatus whether at least one sector of information reproduced from the recording medium is stored in the buffer memory; and wherein the reproducing apparatus further includes means for informing the computer system that at least one sector of information reproduced from the recording medium is stored in the buffer memory when at least one sector of information reproduced from the recording medium has been stored in the buffer memory, and for informing the computer system that information is currently being reproduced from the recording medium when less than one sector of information reproduced from the recording medium has been stored in the buffer memory.

10. An information reproducing system comprising:

a reproducing apparatus for reproducing information from a recording medium on which information including a control program, image data, and voice data is recorded, the control program, the image data, and the voice data being recorded at separate locations on the recording medium, the control program specifying how the image data and the voice data recorded on the recording medium are to be reproduced, stored, modified, and output, the control program including at least one control table;

a display unit for displaying image data;

a voice output unit for outputting voice data; and a computer system including:

a system memory;

an image memory;

a voice output memory;

means for controlling the reproducing apparatus to reproduce the control program recorded on the recording medium, and for storing the reproduced control program in the system memory;

means for executing the stored control program;

means for controlling the reproducing apparatus to selectively reproduce the image data and the voice data recorded on the recording medium by individually reproducing the image data and the voice data from the separate locations at which the image data and the voice data are stored on the recording medium in accordance with the at least one control table in the executed control program;

means for selectively storing the reproduced image data and the reproduced voice data in one of the system memory, the image memory, and the voice output memory in accordance with the at least one control table in the executed control program;

means for modifying reproduced image data and reproduced voice data stored in the system memory in accordance with the executed control program, for storing the modified image data in the image memory, and for storing the modified voice data in the voice output memory; and means for controlling the image memory to output image data stored therein to the display unit in accordance with the at least one control table in the executed control program, and for controlling the voice output memory to output voice data stored therein to the voice output unit in accordance with the executed control program.

* * * * *